US008652592B2

(12) United States Patent
Hoshino et al.

(10) Patent No.: US 8,652,592 B2
(45) Date of Patent: Feb. 18, 2014

(54) DISCRIMINATION MEDIUM AND DISCRIMINATION METHOD FOR DISCRIMINATING THE SAME

(75) Inventors: Hidekazu Hoshino, Yokohama (JP); Itsuo Takeuchi, Yokohama (JP)

(73) Assignee: NHK Spring Co., Ltd., Yokohama (JP)

(*) Notice: Subject to any disclaimer, the term of this patent is extended or adjusted under 35 U.S.C. 154(b) by 967 days.

(21) Appl. No.: 12/760,314

(22) Filed: Apr. 14, 2010

(65) Prior Publication Data

US 2010/0194092 A1 Aug. 5, 2010

Related U.S. Application Data

(62) Division of application No. 10/584,344, filed as application No. PCT/JP2004/019525 on Dec. 27, 2004, now abandoned.

(30) Foreign Application Priority Data

Dec. 26, 2003 (JP) ................................ 2003-433806

(51) Int. Cl.

| | |
|---|---|
| ***B44F 1/10*** | (2006.01) |
| ***G03G 7/00*** | (2006.01) |
| ***B41M 5/00*** | (2006.01) |
| ***B42D 15/10*** | (2006.01) |
| ***G06K 9/76*** | (2006.01) |
| ***G01N 21/55*** | (2006.01) |
| ***G03H 1/00*** | (2006.01) |
| ***G09F 9/35*** | (2006.01) |
| ***G02F 1/13*** | (2006.01) |

(52) U.S. Cl.
USPC .............. 428/29; 428/195.1; 283/72; 356/71; 356/447; 359/2; 40/448; 349/193

(58) Field of Classification Search
None
See application file for complete search history.

(56) References Cited

U.S. PATENT DOCUMENTS

| | | | | |
|---|---|---|---|---|
| 4,608,288 | A | 8/1986 | Spindler | |
| 4,856,857 | A | 8/1989 | Takeuchi et al. | |
| 5,700,550 | A | 12/1997 | Uyama et al. | |
| 6,129,975 | A | 10/2000 | Curiel | |
| 6,343,745 | B1 * | 2/2002 | Bohm et al. | 235/493 |
| 2003/0133098 | A1 | 7/2003 | Hoshino et al. | |

FOREIGN PATENT DOCUMENTS

| | | |
|---|---|---|
| JP | U-04-116871 | 10/1992 |
| JP | A-06-015985 | 1/1994 |
| JP | A-06-106882 | 4/1994 |
| JP | A-08-080680 | 3/1996 |
| JP | A-09-095054 | 4/1997 |
| JP | A-11-198537 | 7/1999 |

(Continued)

*Primary Examiner* — David Sample
*Assistant Examiner* — Nicole T Gugliotta
(74) *Attorney, Agent, or Firm* — Oliff PLC

(57) ABSTRACT

A discrimination medium on which printing can be freely performed, which cannot be easily falsified, in which the authenticity can be easily discriminated by unique appearance, and which can be produced at low cost, is provided. A cholesteric liquid crystal layer 10, and a breakable print recording layer are laminated in the discrimination medium. The cholesteric liquid crystal layer 10 has plural light transparent films, which are laminated and are different from each other in refraction index. Therefore, the discrimination medium has unique optical characteristics such that a character, a symbol, a pattern, a figure formed by printing by a thermal printer or the like changes in color depending on the viewing angle. A discrimination method using the above optical characteristics of the discrimination medium is provided.

1 Claim, 4 Drawing Sheets

(56) References Cited

FOREIGN PATENT DOCUMENTS

| | | | | |
|---|---|---|---|---|
| JP | A-2001-063300 | | 3/2001 | |
| JP | A-2002-127647 | | 5/2002 | |
| JP | A-2003-029233 | | 1/2003 | |
| JP | 2003-326823 | * | 11/2003 | ............... B41M 3/14 |
| JP | A-2003-326823 | | 11/2003 | |

* cited by examiner

DISCRIMINATION MEDIUM AND DISCRIMINATION METHOD FOR DISCRIMINATING THE SAME

CROSS-REFERENCE TO RELATED APPLICATIONS

This is a Division of application Ser. No. 10/584,344 filed Jun. 23, 2006, which in turn is a National Stage Application of PCT/JP2004/019525, filed Dec. 27, 2004, which claims the benefit of Japanese Patent Application No. 2003-433806 filed Dec. 26, 2003. The disclosure of the prior applications is hereby incorporated by reference herein in its entirety.

TECHNICAL FIELD

The present invention relates to techniques advantageously used for determining whether or not passports, documents, various types of cards, passes, bills, exchange tickets for money, security notes, bonds, gift certificates, pictures, tickets, public game voting tickets, recording media in which sound data and image data are recorded, recording media in which computer software is recorded, various industrial products, products of foods, medicines, and sundries, and product labels applied to packages for products are authentic.

BACKGROUND ART

Product labels, on which the contents of products, compositions of products, place of production, production number, production date, and barcode are printed are applied to industrial products and packages therefor. Since the above information varies depending on each product, mass production of one label cannot be performed. Due to this, printing is performed on a label, which has a breakable print recording layer facilitating production in small lots, by a thermal printer, laser, an electric discharge printer, or the like. However, recently, counterfeit products having falsified product labels applied thereon or counterfeit products having genuine product labels peeled from genuine products are on market, and a large amount of damage is caused. In order to prevent the above illegal use of product labels, techniques for discriminating the authenticity of product labels are needed.

Patent Publication 1 discloses a technique in which plural colored layers are used, although the number of colored layer is generally one, and depth of breakage caused by a thermal head is controlled in order to show plural mixed colors and color tone, and the colored layer is combined with the color tone of a printed layer in order to form a complicated pattern. Patent Publication 2 discloses a technique in which a thermal breakage type print recording layer and an electric discharge breakage type print recording layer are provided, and breakable print using characteristics of the layers is simultaneously formed on a surface and a reverse surface. Patent Publication 3 discloses a technique in which a thermal breakage type print recording layer and a hologram are combined and designability and difficulty of counterfeit holograms are provided to a thermosensitive recording paper.

The Patent Publication 1 is Japanese Unexamined Patent Application Publication No. Hei 6-15985. The Patent Publication 2 is Japanese Unexamined Patent Application Publication No. Hei 6-106882. The Patent Publication 3 is Japanese Unexamined Patent Application Publication No. Hei 8-80680.

DISCLOSURE OF THE INVENTION

Problems Solved by the Invention

However, since plural colored layers are used, the number of production processes is increased, and production cost is high. In addition, since a large number of colored layers are laminated, material costs are high. In the technique using a hologram, in recent years, falsification techniques for holograms have increased in sophistication and counterfeit goods for which the authenticity is difficult to determine may be produced, so that techniques using holograms are becoming unreliable. Due to these, techniques are required in which falsification is more difficult, in which it is easy to determine whether or not goods are authentic, and in which product labels can be produced at low cost.

An object of the present invention is to provide a discrimination medium, which has a simple composition of materials and can be easily produced so that material costs and production costs are low. Another object of the present invention is to provide a discrimination medium, which uses materials, which are difficult to falsify and therefore cannot be easily falsified. Another object of the present invention is to provide a discrimination medium in which the authenticity can be reliably and easily determined by unique appearance of the discrimination medium. Another object of the present invention is to provide a discrimination method, which is superior in discriminating the above discrimination medium.

Means for Solving the Problems

According to one aspect of the present invention, a discrimination medium comprising: a multilayer film having plural light transparent films which are laminated and are different from each other in refraction index, the multilayer film having a surface; and a breakable print recording layer provided at least a portion of at least the surface of the multilayer film. When a predetermined condition is applied to a portion of the breakable print recording layer, the portion of the breakable print recording layer is removed from the discrimination medium.

In the above structured discrimination medium, the multilayer film having plural light transparent films which are laminated and are different from each other in refraction index is exposed on the removed portion of the breakable print recording layer. Since a character, a symbol, or a pattern formed on the exposed portion of the multilayer film changes in color depending on the viewing angle, the discrimination medium is different from a product label having a colored layer does not change in color depending on the viewing angle, and it can be easily determined whether or not the discrimination medium is authentic. When there are typical coating apparatuses, the multilayer film can be easily produced thereby at low cost. However, when there are not typical coating apparatuses, falsification of the multilayer film is difficult. In this case, if an attempt is made to produce the multilayer film, production cost is very high. Thus, falsification of the discrimination medium can be reliably prevented even though the production cost is low.

According to another aspect of the present invention, a discrimination medium includes: a cholesteric liquid crystal layer having a circular polarization light selectivity of reflecting predetermined circularly polarized light and having a surface; and a breakable print recording layer provided at least a portion of at least the surface of the cholesteric liquid crystal layer. When a predetermined condition is applied to a portion of the breakable print recording layer, the portion of the breakable print recording layer is removed from the discrimination medium.

In the above structured discrimination medium, the cholesteric liquid crystal layer having a circular polarization light selectivity of reflecting predetermined circularly polarized light is exposed on the removed portion of the breakable print recording layer. Since a character, a symbol, or a pattern formed on the exposed portion of the cholesteric liquid crystal layer changes in color depending on the viewing angle, the discrimination medium is different from a product label having a colored layer which does not change in color depending on the viewing angle, and it can be easily determined whether or not the discrimination medium is authentic. Specific apparatuses and specific materials are necessary for production of the discrimination medium. When there are specific apparatuses and specific materials, the cholesteric liquid crystal layer can be easily produced at low cost. However, when there are not specific apparatuses and specific materials, falsification of the cholesteric liquid crystal layer is difficult. In this case, if an attempt is made to produce the cholesteric liquid crystal layer, production cost is very high. Thus, falsification of the discrimination medium can be reliably prevented, even though the production cost is low.

According to a preferred embodiment of the present invention, the discrimination medium further includes: a printed layer provided at least of a portion of the breakable print recording layer. In this discrimination medium, a character, a symbol, or a pattern, which is the same as the character, the symbol, or the pattern formed by the removed portion of the breakable print recording layer is formed on the printed layer. When the viewing angle is changed, a portion of the discrimination medium changes in color. Therefore, the discrimination medium is different from a product label having a colored layer, which does not change in color depending on the viewing angle, and it can be easily determined whether or not the discrimination medium is authentic.

According to a preferred embodiment of the present invention, the printed layer has substantially the same color as the color of the multilayer film or the cholesteric liquid crystal layer when the multilayer film or the cholesteric liquid crystal layer is viewed from a predetermined direction. In this discrimination medium, when the discrimination medium is viewed at the predetermined angle, the character, the symbol, or the pattern formed by the removed portion of the breakable print recording layer, and the printed layer, are the same color and cannot be discriminated. When the viewing angle is changed, the character, the symbol, or the pattern is visible again and can be discriminated. Thus, the discrimination medium is different from a product label having a colored layer, which does not change in color depending on the viewing angle, and it can be easily determined whether or not the discrimination medium is authentic.

According to a preferred embodiment of the present invention, the discrimination medium further includes: an adhesive layer, which is provided to the multilayer film or the cholesteric liquid crystal layer and includes a black pigment. In this discrimination medium, since light having color which is other than the color of the character, the symbol, or the pattern formed by the removed portion of the breakable print recording layer is absorbed by the adhesive layer including a black pigment, the color of the character, the symbol, or the pattern formed by the removed portion thereof can be clearly seen. Thus, the difference between the discrimination medium and the counterfeit is clear.

According to a preferred embodiment of the present invention, at least a portion of the multilayer film or the cholesteric liquid crystal layer is subjected to hologram working or embossing. In this discrimination medium; the character, the symbol, or the pattern formed by the removed portion of the breakable print recording layer can be changed not only in color but also in shape. Therefore, the difference between the discrimination medium and the counterfeit is clear. In addition, since the discrimination medium exhibits a complicated feature, falsification of the discrimination medium is difficult.

According to a preferred embodiment of the present invention, the discrimination medium further includes: an interlayer peeling structure or a peeling breaking structure at least a portion of the multilayer film or the cholesteric liquid crystal layer. In this discrimination medium, when the discrimination medium is applied to a product or an article once and is then peeled therefrom, peeling occurs in the interlayer peeling structure or the peeling breaking structure, and the discrimination medium cannot be used as a product label again. Therefore, misuse of the discrimination medium to make counterfeit products appear to be real products can be prevented.

According to a preferred embodiment of the present invention, the adhesive layer is composed of transformable adhesive or peelable adhesive, and one of a character, a symbol and a pattern is formed and discriminated on the article or the discrimination medium when the adhesive layer is peeled from the discrimination medium. In this discrimination medium, when the discrimination medium is applied to a product or a package once and is peeled therefrom, transforming or peeling occurs in the interlayer peeling structure or the peeling breaking structure, so that peeling of the discrimination medium applied to the product or the package can be clearly discriminated, and the discrimination medium cannot be used as a product label again. Therefore, misuse of the discrimination medium for disguising counterfeit product as real product can be prevented.

According to a preferred embodiment, the breakable print recording layer and the printed layer are provided at least portions of both sides of the multilayer film or the cholesteric liquid crystal layer. In this discrimination medium, characters, symbols, or patterns can be formed on both sides of the multilayer film or the cholesteric liquid crystal layer by the removed portion of the breakable print recording layer. Since the characters, the symbols, or the patterns change in color depending on the viewing angle, the discrimination medium is different from a product label having a colored layer, which does not change in color depending on the viewing angle, and it can be easily determined whether or not the discrimination medium is authentic.

According to another aspect of the present invention, a discrimination method for discriminating a discrimination medium is provided. The discrimination medium includes: a multilayer film having plural light transparent films which are laminated and are different from each other in refraction index, the multilayer film having a surface; and a breakable print recording layer provided at least a portion of at least the surface of the multilayer film. When a predetermined condition is applied to a portion of the breakable print recording layer, the portion of the breakable print recording layer is removed from the discrimination medium. The discrimination method includes: observing the discrimination medium from one or more predetermined viewing angles.

According to another aspect of the present invention, a discrimination method for discriminating a discrimination medium is provided. The discrimination medium includes: a cholesteric liquid crystal layer having a circular polarization light selectivity of reflecting predetermined circularly polarized light and having a surface; and a breakable print recording layer provided at least a portion of at least the surface of the cholesteric liquid crystal layer. When a predetermined condition is applied to a portion of the breakable print recording layer, the portion of the breakable print recording layer is removed from the discrimination medium. The discrimination method includes: observing the discrimination medium via an optical filter allowing a predetermined circularly polarized light to selectively pass therethrough.

A discrimination medium 1 having a typical breakable print recording layer shown in FIG. 1 will be explained hereinafter. The discrimination medium 1 has a laminated structure in which a separator 7, an adhesive layer 6, a colored layer (which is also used as a substrate) 12, an anchor layer 9, a breakable print recording layer 4, a printed layer 3, and a protection layer 2 are laminated in turn from beneath. The separator 7 is separatable, and is peeled from the discrimination medium 1 before discrimination medium 1 is applied to the article. The adhesive layer 6 is formed such that a binder is mixed with a plasticizer, a stabilizer, a curing agent, or the like if necessary, is sufficiently kneaded with a solvent or a diluent, and is applied to a substrate by a coating method, for example, a gravure method, a roll method, or a knife edge method. The binder may be composed of one selected from the group consisting of polyvinyl chloride acetate copolymer, ethylene vinyl acetate copolymer, vinyl chloride propionate copolymer, rubber based resin, cyanoacrylate resin, cellulose based resin, ionomer resin, and polyolefin based copolymer.

The colored layer 12 is composed of one selected from the group consisting of plastic, metal, paper, and impregnated paper or mixture thereof. The surface color of the substrate can be used. Alternatively, various coatings or various inks may be formed by a coating method or a printing method such as a gravure method, a roll method, a knife-edge method, and an offset method. The plastic may be selected from the group consisting of nylon, cellulose, diacetate, cellulose triacetate, polystyrene, polyethylene, polypropylene, polyester, polyimide, and polycarbonate, etc. The metal may be selected from copper and aluminum, etc. The allowable heat resistance temperature limit of the colored layer 12 is preferably relatively higher than that of the printed layer 3.

The anchor layer 9 can be composed of one selected from the group consisting of thermoplastic resin, polyurethane resin, epoxide resin, and ketone resin, can be transparent, and can have a thickness of about 0.005 to 0.5 mm. The thermoplastic resin may be selected from polyvinylchloride, polystyrene, and acrylic. The breakable print recording layer 4 is of a thermosensitive breakage type or an electronic discharge breakage type. The breakable print recording layer 4 is composed of one selected from metal and alloy, or mixture thereof. The metal is selected from Te, Sn, In, Al, Bi, Pb, Zn, Cu, Ni, Cr, and Ti, etc. The alloy is an Fe—Co alloy. The breakable print recording layer 4 can be formed on the colored layer 12 by vacuum deposition, sputtering, or plating.

The printed layer 3 is composed of the same material as the above coating and the ink coated on the above colored layer 12. The protection layer 2 can be formed by laminating synthetic resin, extrusion coating or coating of synthetic resin. In consideration of purpose or adhesion to another layer, the synthetic resin of the protection layer 2 generally uses the same synthetic resin as that for forming the substrate of the colored layer 12. In particular, when thermosetting synthetic resin is used, surface hardness and prevention of pollution are advantageous. When a coating including an ultraviolet curable synthetic resin is used, curing can be performed quickly. Thus, the coating is favorably used.

The surface of the above discrimination medium 1 is subjected to local heating by a thermal printer or electric discharge printer, and it is thereby melted and broken. Thus, as shown in FIG. 2, a removed portion 8 can be formed. A character, a symbol, a pattern, or a design can be visually formed by the removed portion 8. The character may be the date of production or production number. The symbol may be a brand mark. The pattern may be a barcode.

Optical characteristics of cholesteric liquid crystal layer will be explained. FIG. 3 is a conceptual diagram showing a structure of the cholesteric liquid crystal layer. The cholesteric liquid crystal has a stacked structure. The molecular long axes of respective layers of the stacked structure are parallel to each other, and are parallel to the plane thereof. The respective layers are rotated slightly with respect to the adjacent layer and are stacked. The cholesteric liquid crystal thereby has a three-dimensional spiral structure.

Denoting that, in a direction perpendicular to the layer, pitch P is a distance needed when the molecular long axis is rotated through 360 degrees and returns to the initial state, and an average refraction index of the respective layers is index N, the cholesteric liquid crystal layer selectively reflects circularly polarized light having a center wavelength λs satisfying the equation $\lambda s = N \times P$. That is, when light (natural light), which is not predetermined circularly, polarized light is irradiated on the cholesteric liquid crystal layer, the cholesteric liquid crystal layer selectively reflects circularly polarized light having a center wavelength μs. The polarization direction of the circularly polarized light reflected by the cholesteric liquid crystal layer is clockwise or counterclockwise depending on the rotation direction of the cholesteric liquid crystal layer. That is, circularly polarized light having the above predetermined center wavelength and the above predetermined circular polarization direction is selectively reflected by the cholesteric liquid crystal layer. Circularly polarized light having another wavelength and the above predetermined circular polarization direction, linearly polarized light, and circularly polarized light having circular polarization direction opposite to the above predetermined circular polarization direction passes through the cholesteric liquid crystal layer.

FIG. 4 is a conceptual diagram showing a condition in which light having a predetermined wavelength and a predetermined circular polarization direction is selectively reflected by a cholesteric liquid crystal layer 10. For example, FIG. 4 shows a cholesteric liquid crystal layer 10 having a spiral structure in which the molecular long axes of the respective layers are rotated in a clockwise direction (right-handed direction). When natural light enters the cholesteric liquid crystal layer 10, right-handed circularly polarized light having the predetermined center wavelength is selectively reflected by the cholesteric liquid crystal layer 10. Another polarization light (linearly polarized light and left-handed circularly polarized light) and right-handed circularly polarized light having another center wavelength pass through the cholesteric liquid crystal layer 10.

For example, a cholesteric liquid crystal layer having a structure shown in FIG. 3 and reflecting light having a center wavelength as of red light is disposed on a member such as a black sheet absorbing visible light. When random light such as sunlight is irradiated on the cholesteric liquid crystal layer, transmission light of the cholesteric liquid crystal layer is absorbed in the black sheet, and right-handed circularly polarized light having the predetermined center wavelength is selectively reflected by the cholesteric liquid crystal layer. As a result, the cholesteric liquid crystal layer is clearly seen to be red. The above characteristic of selectively reflecting predetermined circularly polarized light having a predetermined center frequency is called circularly polarized light selectivity.

The color of the cholesteric liquid crystal changes depending on the viewing angle. When incident light obliquely enters the cholesteric liquid crystal, the apparent pitch P decreases, and the center wavelength λs is thereby short. For example, reflection light reflected by the cholesteric liquid crystal is seen to be red at an angle perpendicular to the cholesteric liquid crystal. As the viewing angle is increased, the color of light shifts to orange, yellow, green, blue-green, and blue in turn. This phenomenon is called blue shift. The viewing angle is an angle between a line of vision and a line perpendicular to a viewing surface.

Optical characteristics of a multilayer film having plural light transparent films, which are different from each other in refraction index, will be explained. FIG. 5 is a conceptual diagram showing a condition in which the multilayer film reflects light. FIG. 5 shows one example in which films 5*a* (A layers) having a first refraction index and films 5*b* (B layers) having a second refraction index are alternately laminated.

When white light is irradiated on the multilayer film 5, incident light is reflected at the interfaces of the films different from each other in refraction index based on Fresnel's law. In this case, a portion of the incident light is reflected at the interface between the A layer and the B layer, and another portion of the incident light passes therethrough. Since each interface between the A layer and the B layer repeatedly exists, interferences between reflection light reflected at each interface occur. The larger the angle of the incident light, the shorter the optical path difference of the reflection light reflected by each interface. The interference of each light of the shorter wavelength occurs, and the intensity of the light of the shorter wavelength is thereby strong. Therefore, the more obliquely the multilayer film 5 on which white light is irradiated is viewed, that is, the more parallel to the plane of the multilayer film 5 the multilayer film 5 on which white light is irradiated is viewed, the shorter the wavelength of the light reflected strongly by the multilayer film 5. For example, the more oblique the multilayer film 5 on which white light is irradiated, the bluer the reflection light reflected by the multilayer film 5. This phenomenon is called blue shift. The incident angle is an angle between incident light and a line perpendicular to the incident surface.

The multilayer film having plural light transparent films, which are different from each other in refraction index, is structured such that at least two kinds of light transparent films, which are different from each other in refraction index, are laminated, and at least one interface between the light transparent films, which are different from each other in refraction index exists. For example, the multilayer film is structured such that two light transparent films, which are different from each other in refraction index are alternately laminated. Alternatively, the multilayer film is structured such that the first to the Nth light transparent films having the first to the Nth refraction indexes are laminated in turn as one unit and plural units are laminated. The N in Nth denotes a natural number.

Effects of the Invention

In the present invention, printing can be freely performed as needed. Since complicated optical characteristics of the discrimination medium are combined, falsification of discrimination is difficult, and it can be reliably and easily determined whether or not discrimination medium is authentic. The production cost is low. The discrimination method for discriminating the discrimination medium is superior in determining whether or not discrimination medium is authentic.

In the present invention, since the discrimination medium can be discriminated by complicated combination of the left-handed circularly polarized light, right-handed circularly polarized light, the color, the figure, and the optical phenomenon of the color shift, falsification cannot be performed by using a copy in which images are scanned. The discrimination medium is superior in color, and is thereby superior in design, so that the discrimination medium is advantageous for an article having superior design as the article to be discriminated.

EXPLANATION OF REFERENCE NUMERALS

1 denotes a discrimination medium, 1' denotes a discrimination medium after printing, 2 denotes a protection layer, 3 denotes a printed layer, 4 denotes a breakable print recording layer, 5 denotes a multilayer film, 6 denotes an adhesive layer, 7 denotes a separator, 8 denotes a removed portion, 9 denotes an anchor layer, 10 denotes a cholesteric liquid crystal layer, 11 denotes a substrate, 12 denotes a colored layer, 13 denotes a roll discrimination medium, and 14 denotes a low melting point metal removed region.

BEST MODE FOR CARRYING OUT THE INVENTION

First Embodiment

Figure 1:
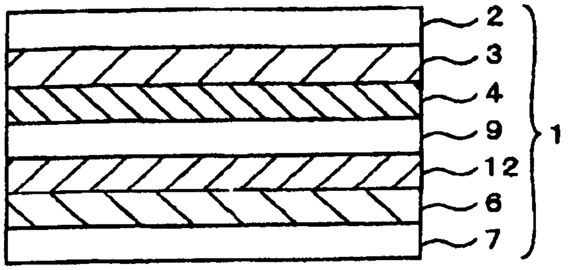
Fig. 1 Prior Art
FIG. 1 is a cross sectional view showing a discrimination medium such as a label having a conventional breakable print recording layer.
Figure 2:
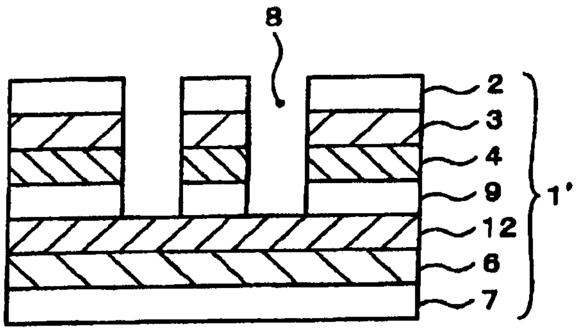
Fig. 2 Prior Art
FIG. 2 is a cross sectional view showing a discrimination medium of which a portion of a conventional breakable print recording layer is removed.
Figure 3:
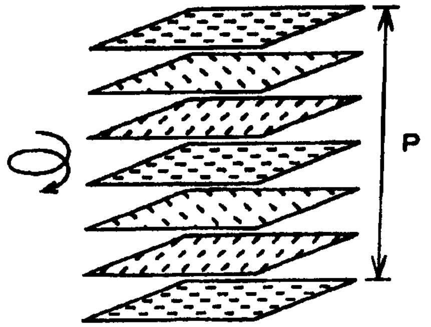
FIG. 3 is a conceptual diagram for explaining a structure of a cholesteric liquid crystal layer.
Figure 4:
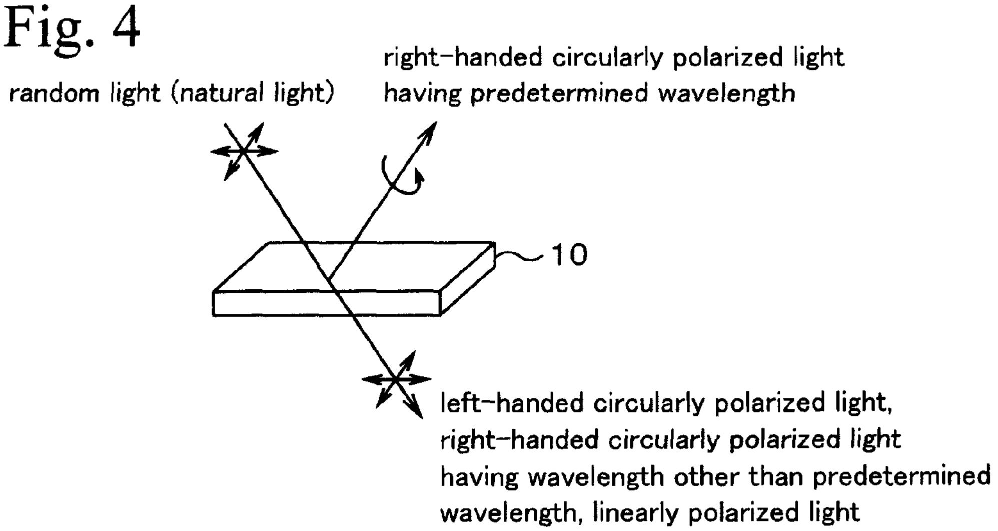
FIG. 4 is a conceptual diagram for explaining optical characteristics of a cholesteric liquid crystal layer.
Figure 5:
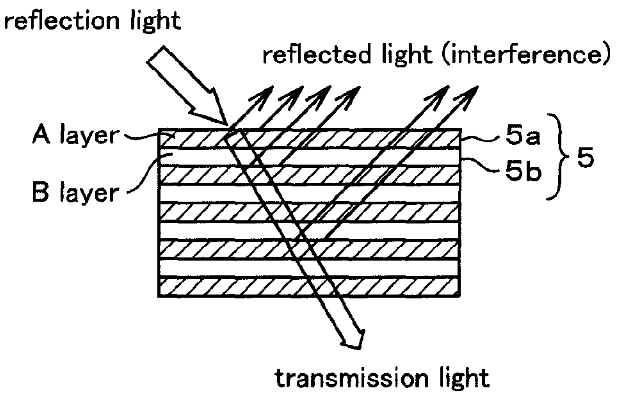
FIG. 5 is a conceptual diagram for explaining optical characteristics of a multilayer film.
Figure 6:
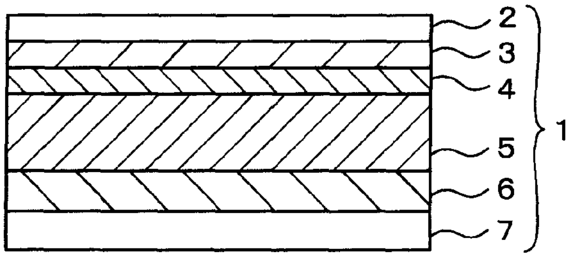
FIG. 6 is a cross sectional view showing a discrimination medium of the First Embodiment.

FIG. 6 is a cross sectional view showing a discrimination medium 1 of the First Embodiment. For example, the discrimination medium 1 can be used as a product label, which is applied on a product or a package of a product and is used for discriminating the product. The discrimination medium 1 has a laminated structure in which a separator 7, an adhesive layer 6, a multilayer film 5, a breakable print recording layer 4, a printed layer 3, and a protection layer 2 are laminated in turn from beneath. When the discrimination medium 1 is applied to a product or the like, the separator 7 is peeled from the discrimination medium 1, and the discrimination medium 1 is adhered thereto by the adhesive layer 6.

The separator 7 is a paper or a film, which is subjected to surface processing using silicone, fluororesin, wax, or the like and is thereby separatable. The adhesive layer 6 secures the discrimination medium 1 to an article. The adhesive layer 6 can be composed of an adhesive used in a typical discrimination medium, ultraviolet curable resin, or thermosetting resin.

The adhesive layer 6 functions as a light absorption layer. Thus, the adhesive layer 6 includes a black pigment of carbon or a dark pigment of carbon, and thereby has a light absorption characteristic. A light absorption layer absorbing visible light, which is different from the adhesive layer 6, may be provided. The adhesive layer 6 may be processed such that a character is formed when the adhesive layer 6 is peeled.

The multilayer film 5 has 201 layers structured such that first films 5*a* are composed of polyethylene-2,6-naphthalate and second films 5*b* are composed of polyethylene terephthalate. The multilayer film 5 has a thickness of 20 μm. In a production method for the multilayer film 5, 101 layers (A layers) are composed of polyethylene-2,6-naphthalate and 100 layers (B layers) are composed of polyethylene terephthalate including 12 mol % of isophthalic acid copolymerized therewith. The 101 layers (A layers) and the 100 layers (B layers) are laminated alternately, so that an unstretched sheet having 201 layers is produced. The sheet is stretched at a temperature of 140 degrees C. so as to be 3.5 times as long as the initial sheet in a longitudinal direction, and the sheet is stretched at a temperature of 150 degrees C. so as to be 5.7 times as long as the initial sheet in a lateral direction. Next, the sheet is subjected to heating at a temperature of 210 degrees C., and a laminated structure having a thickness of 20 μm is obtained. In the above manner, the multilayer film 5 is obtained. In this example, when incident light enters the multilayer film 5 at an incident angle of 0 degrees, red light is reflected by the multilayer film 5. The material of the multilayer film 5 is not limited to the above material. Instead of using the films composed of different kinds of materials described above, films composed of the same materials and having different refraction indexes can be used. The multilayer film 5 can be anisotropic by changing the stretch ratio of longitudinal and lateral directions. The anisotropic multilayer film in the case in which the discrimination medium is inclined in a longitudinal direction is different in color change from that in the case in which the discrimination medium is inclined in a lateral direction. When adhesion between the multilayer film 5 and the breakable print recording layer 4 is not good, an anchor layer 9 is appropriately provided there between, so that the adhesion can be improved.

The breakable print recording layer 4 can be formed by depositing Sn at a thickness of 800 Å at a temperature of 230 degrees C. The material of the breakable print recording layer 4 is not limited to the above material. The breakable print recording layer 4 can be appropriately composed of material used for the breakable print recording layer of the typical discrimination medium described above.

For example, the printed layer 3 can be formed by coating a red urethane based coating having a thickness of 10 μm. The printed layer 3 can be appropriately composed of coating or ink used for the colored layer of the typical discrimination medium described above. Alternatively, the printed layer may not be provided.

For example, the protection layer 2 can be composed of isotopic triacetylcellulose (TAC) having a thickness of 40 μm. The protection layer 2 has an isotropic refraction index in order to maintain polarization condition of circularly polarized light passing therethrough. The protection layer 2 can be appropriately composed of material used for the protection layer of the typical discrimination medium described above. The protection layer 2 may not be provided.

Figure 7:
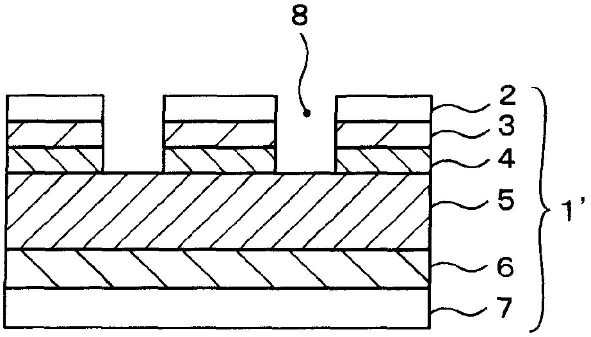
FIG. 7 is a cross sectional view showing a discrimination medium after printing of the First Embodiment.

FIG. 7 shows a discrimination medium 1' obtained by performing printing on the discrimination medium 1 having the above laminated structure by a thermal printer, an electric discharge printer, or the like. Portions of the protection layer 2, the printed layer 3, and the breakable print recording layer 4 are melted, broken, and removed, so that a removed portion 8 is formed.

Figure 8:
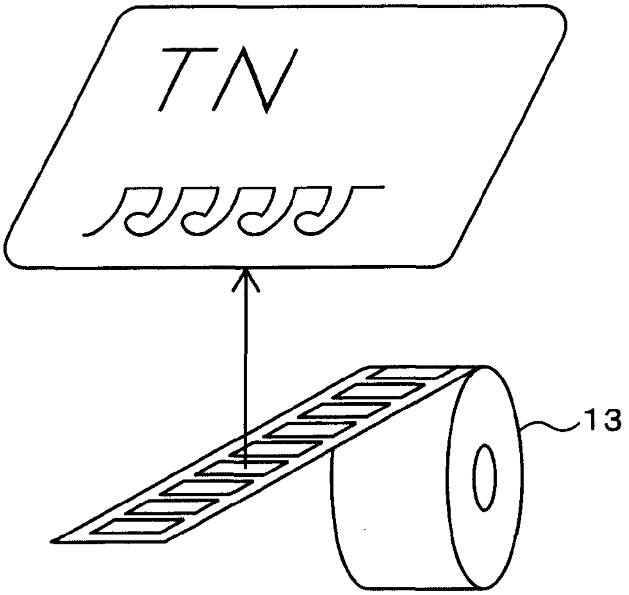
FIG. 8 is a schematic diagram showing a discrimination medium 1 applied to production label and a perspective view showing a condition in which a character and a pattern emerges on the production label.

When the discrimination medium 1' after the printing is viewed from the side of the protection layer 2 under white light or the like, the discrimination medium 1' appears to be red overall, so that the character cannot be discriminated. However, when the discrimination medium 1' is gradually inclined and the incident angle is increased, as shown in FIG. 8, since the color of the removed portion 8 gradually shifts to orange, green, blue, and violet in turn, the removed portion 8 can be seen as a character. The color of the printed layer may not be the same as that of the multilayer film, and may be a color such that the printed layer and the multilayer film can be clearly discriminated. Various characters, symbols, figures, or patterns may be printed on the printed layer.

In mass production of the discrimination mediums, the discrimination mediums are sequentially produced in a long sheet shape, and they are rolled by a roller 13 shown in the lower part of the drawing of FIG. 8. A portion of the discrimination medium above the separator 7 is cut to a size of a product label or the like, an extra portion there around is removed, and the separator 7 is peeled, so that the discrimination medium can be applied to an article.

Second Embodiment

Figure 9:
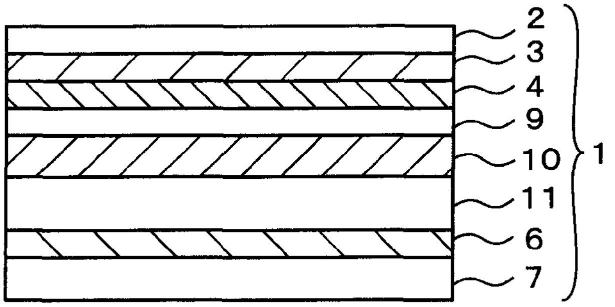
FIG. 9 is a cross sectional view showing a discrimination medium of the Second Embodiment.

FIG. 9 is a cross sectional view showing a discrimination medium 1 of the Second Embodiment. For example, the discrimination medium 1 can be used as a product label applied on a product or a package of a product and used for discriminating the product. The discrimination medium 1 has a laminated structure in which a separator 7, an adhesive layer 6, a substrate 11, cholesteric liquid crystal layer 10, an anchor layer 9, a breakable print recording layer 4, a printed layer 3, and a protection layer 2 are laminated in turn from beneath. When the discrimination medium 1 is applied to a product or the like, the separator 7 is peeled from the discrimination medium 1, and the discrimination medium 1 is adhered thereto by the adhesive layer 6.

Next, a production method for the cholesteric liquid crystal layer 10 will be explained hereinafter. For example, a low molecular cholesteric liquid crystal is dissolved and held in a polymerized monomer, so that cholesteric liquid crystals grow. After that, the low molecular liquid crystals are joined by photoreaction or thermal reaction, so that the molecular orientation thereof is fixed, and the low molecular liquid crystal is formed into a polymer thereof. As a result, raw liquid of cholesteric liquid crystal is obtained. The raw liquid is applied to a surface of polyethylene terephthalate (PET) to have a predetermined thickness. The polyethylene terephthalate is the substrate 11 and has a thickness of 50 μm. The raw liquid is oriented in a cholesteric orientation, and molecular orientation thereof is fixed. In this case, for example, the cholesteric liquid crystal has a uniform torsion pitch P extending in a molecular layered direction thereof, and has a layered thickness of 2 μm. The cholesteric liquid crystal layer appropriately has a thickness of about 0.5 to 5.0 μm. In this example, the pitch p is controlled such that the cholesteric liquid crystal layer 10 appears to be red when right-handed circularly polarized light enters the cholesteric liquid crystal layer 10 and the viewing angle is 0 degrees.

Regarding another method for obtaining raw liquid of cholesteric liquid crystal, polymer thermotropic polymer liquid crystal of branched-chain type or straight-chain type may be heated to a temperature of the liquid crystal transition point thereof or higher, so that a cholesteric liquid crystal structure thereof grows, and may be then cooled to a temperature of the liquid crystal transition point or lower, so that the molecular orientation thereof is fixed. Alternatively, polymer lyotropic liquid crystal of the branched-chain type or straight-chain type may be oriented in a cholesteric orientation in a solvent, and the solvent may be gradually evaporated, so that molecular orientation thereof is fixed.

Regarding raw materials of the above materials, a branched-chain type polymer having a liquid crystal forming group in a branched-chain, for example, polyacrylate, polymethacrylate, polysiloxane, or polymalonate may be used. Alternatively, a straight-chain type polymer having a liquid crystal forming group in a straight chain, for example, polyester, polyester amide, polycarbonate, polyamide, or polyimide, may be used.

A thermal printer prints on the protection layer 2 of the discrimination medium 1 of the Second Embodiment produced in the above manner, so that a barcode pattern is formed. When the discrimination medium 1' after the printing is viewed from the side of the protection layer 2 under white light or the like, the discrimination medium 1' appears to be red overall, so that the barcode cannot be discriminated. However, when the discrimination medium 1' is gradually inclined and the incident angle is increased, as shown in FIG. 8, since the color of the removed portion 8 gradually shifts to orange, green, blue, and violet in turn, the removed portion 8 can be seen as the barcode.

When a film having a right-handed circular polarization light selectivity is disposed on the protection layer 2 of the discrimination medium 1' after the printing, the barcode cannot be seen. When a film having a left-handed circular polarization light selectivity is disposed on the protection layer 2 of the discrimination medium 1' after the printing, the bar code can be seen.

Third Embodiment

Figure 10:
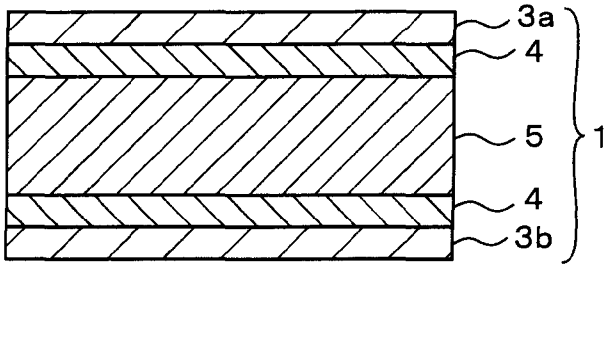
FIG. 10 is a cross sectional view showing a discrimination medium of the Third Embodiment.

FIG. 10 is a cross sectional view showing a discrimination medium 1 of the Third Embodiment. The discrimination medium 1 can be the entirely or a portion of a product, for example, a card, a security note, an exchange tickets for money, or a public game voting ticket, and it can be used for discriminating whether or not the product is authentic. The discrimination medium 1 has a laminated structure, which has a multilayer film 5 at a center portion thereof, breakable print recording layers 4 on the upper and lower sides of the multilayer film 5, and printed layers 3*a* and 3*b* on the upper and lower sides of the breakable print recording layers 4. The discrimination medium 1 has protection layers 2 laminated on the upper and lower sides of printed layers 3*a* and 3*b*, which are not shown in FIG. 10, if necessary. The printed layers 3*a* and 3*b* can be different from each other in materials of which they are formed, color, and pattern formed thereon. In order to recognize the color of the multilayer film, printed color, which is as dark as possible so as to absorb light, is preferably used. Alternatively, a dark light absorption layer may be provided between the printed layer and the breakable print recording layer. A thermal printer can print different characters, different symbols, or different patterns on both sides of the discrimination medium 1 of the Third Embodiment.

Modification Example of First to Third Embodiments

An embossed portion may be provided to the multilayer film 5 or the cholesteric liquid crystal layer 10 by embossing or the like, so that a transparent hologram-forming layer is provided. When the multilayer film 5 is composed of a material on which it is difficult to form an embossed portion, a hologram-forming layer may be formed, if necessary. The upper surface or the lower surface of the cholesteric liquid crystal layer may be subjected to embossing.

When the hologram-forming layer is used as a reflecting hologram, a reflecting hologram is composed of at least one selected from the group of metal, oxide thereof, and nitride thereof, or a metal compound, and it is formed by deposition, sputtering, ion plating, electrolytic plating, electroless plating, or the like. The metal is selected from the group consisting of Cr, Ti, Fe, Co, Ni, Cu, Ag, A, Ge, Al, Mg, Sb, Pb, Pd, Cd, Bi, Sn, Se, In, Ga, and Rb, etc. In this case, the reflecting hologram film is provided between the multilayer film and the adhesive layer, between the adhesive layer and the cholesteric liquid crystal layer, or on the substrate 11. In the discrimination medium 1 having the hologram-forming layer, a pattern can be formed on a region of the character or the symbol after the printing, and the color of the pattern changes depending on the viewing angle.

Modification of First to Third Embodiments

A cut may be provided at a portion of the discrimination medium. In this discrimination medium, when the discrimination medium is forcibly peeled from the article to reuse it, the discrimination medium is broken due to the cut. Thus, the discrimination medium cannot be reused. This structured discrimination medium can be applied to a breakable discrimination seal for determining whether or not a package has been unsealed.

Another Modification of Embodiments

The discrimination medium favorably has an interlayer peeling structure or a peeling breaking structure at least a portion thereof. For example, it is favorable that interlayer peeling easily occurs in the cholesteric liquid crystal layer. For example, when the discrimination medium is peeled from the article, interlayer peeling favorably occurs in a layered structure of the cholesteric liquid crystal layer 10 before the adhesion strength of the adhesive layer 6 is lost. In this discrimination medium, illegal reuse of the discrimination medium can be prevented. For example, a control method for easy interlayer peeling of the cholesteric liquid crystal layer can be performed by controlling the temperature in production.

It is preferable that in peeling of the adhesive layer from the discrimination medium, a character or the like is transferred to the article or the structure of the discrimination medium is changed, so that traces by the peeling appear. A cut is formed to the multilayer film or the cholesteric liquid crystal layer, and the substrate, and the adhesive layer in shape of the characters indicating "Unsealing". Alternatively, a partial peeling layer having a thickness of 0.2 to 5 μm is formed between the adhesive layer or the multilayer film and the substrate in the shape of the characters. In the above manners, the above adhesive layer is formed. The partial peeling layer is composed of ink containing silicone, fluorine compound, and wax, etc.

When this structured discrimination medium is peeled from the article, separation occurs between the multilayer film or the cholesteric liquid crystal layer, and the substrate, and the adhesive layer, so that the characters are formed and remains on the article. Alternatively, interlayer displacement occurs in the partial peeling layer by stress in the peeling, and bubbles enter, so that the feature of the discrimination medium changes in appearance.

The breakable print recording layer can have a structure of which a portion is lost when heating is performed thereon. For example, a film composed of low melting point metal can be used as the breakable print recording layer. When a portion of the film composed of low melting point metal is heated by a head (thermal head) of a thermal printer, the portion is locally melted, and the melted material is moved to be absorbed there around. As a result, a structure in which low melting point metal is removed can be obtained. A predetermined figure can be formed by using this removed portion of the film.

One example of the above feature will be explained hereinafter. FIG. 11 is a cross sectional view showing a discrimination medium having an example of a breakable print recording layer. In this example, a film composed of a low melting point metal is used as the breakable print recording layer. For example, deposited Sn can be used as the low melting point metal. The low melting point metal preferably has a melting point of 300 degrees C. or less.

One example of a production method for the above example will be explained hereinafter. The details of the multilayer film and the adhesive layer are the same as those in the embodiments described above.

First, a film composed of Sn as the breakable print recording layer 4 is formed on a surface of the multilayer film 5 by vacuum deposition. For example, the film has a thickness of 0.4 μm. The thickness is appropriately 0.1 to 1 μm.

Figure 11A:
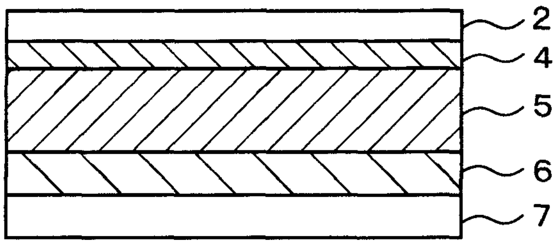
FIG. 11 is a cross sectional view showing a discrimination medium having an example of a breakable print recording layer.

When the breakable print recording layer 4 is formed, the protection layer 2 composed of optically transparent resin or the like is applied thereon. A separator 7 having an adhesive layer 6 provided on a peeling surface thereof is prepared. Then, this adhesive layer 6 is adhered to another surface on which the multilayer film 5 is exposed. As a result, a structure shown in FIG. 11A is obtained. The adhesive layer contains a black pigment absorbing visible light and functions as a light absorption layer.

Figure 11B:
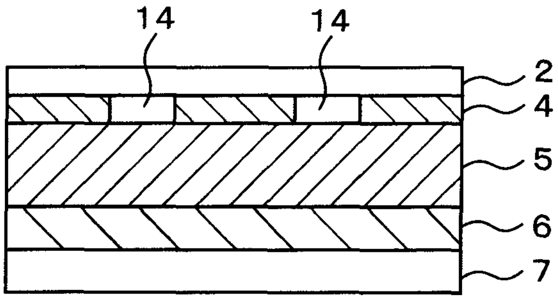

After the structure shown in FIG. 11A is obtained, a thermal printer prints on the protection layer 2. In the printing, melting and deforming do not occur in the protection layer 2 by heat locally applied thereto, and printing is performed on the breakable print recording layer 4 which is a portion of the film composed of Sn based on melting condition. As shown in FIG. 11B, a portion of the film composed of Sn is lost or thinned by the printing. As a result, a low melting point metal removed region 14 is formed such that the film of Sn does not partially exist (or the film is seen such that the film of Sn does not partially exist). This phenomenon is understood as follows. That is, the portion of the film of Sn is subjected to heating by the thermal head and is melted, and the melted material is absorbed by the film of Sn there around which has a temperature which is lower than that of the melted portion, so that the portion (low melting point metal removed region 14) which is seen such that the film of Sn does not partially exist is formed.

The temperature of the thermal head, the distance between the thermal head and the protection layer 2, the material of the protection layer 2, the thickness of the protection layer 2, the material of the breakable print recording layer 4, and the thickness of the breakable print recording layer 4 influence the effects of the printing which can obtain the above phenomenon. Therefore, printing conditions are preferably obtained by tests.

Optical functions in the case in which the character is formed by using the low melting point metal removed region 14 will be explained hereinafter. In this case, when the surface of the protection layer 2 is viewed, metallic luster of Sn is seen on a region other than the low melting point metal removed region 14. The film of Sn does not exist on the low melting point metal removed region 14, and the multilayer film can be seen therefrom.

Therefore, when the protection layer 2 is viewed from the vertical direction, the character and the figure formed by the low melting point metal removed region 14 is seen on the metallic luster surface. When the discrimination medium is inclined overall, the character and the figure exhibit a blue shift, and the color thereof changes. On the other hand, the region other than the low melting point metal removed region 14 is seen such that reflection light reflected by the metallic luster surface is seen when the viewing angle is changed. As a result, the low melting point metal removed region 14 exhibiting a blue shift is distinguished. Thus, the optical functions of the discrimination medium can be obtained.

The structure shown in FIG. 11 is superior in that the structure having the protection layer 2 remaining on the surface can be obtained. Therefore, when processes are not performed after the printing, the observing surface can be covered with the protection layer. In the structure shown in FIG. 11, the cholesteric liquid crystal layer can be used instead of the multilayer film. In this case, the cholesteric liquid crystal layer can be seen from the low melting point metal removed region 14, and the figure can be displayed by using the optical characteristics of the cholesteric liquid crystal layer.

When the cholesteric liquid crystal layer is used instead of the multilayer film 5, the cholesteric liquid crystal layer is viewed via an optical filter allowing a predetermined circularly polarized light to selectively pass therethrough, so that unique optical functions can be obtained.

For example, in this case, reference numeral 5 denotes the cholesteric liquid crystal layer, and the cholesteric liquid crystal layer selectively reflects right-handed circularly polarized red light. In this case, when the discrimination medium shown in FIG. 11 is viewed via an optical filter allowing a right-handed circularly polarized light to selectively pass therethrough, red reflected light from the cholesteric liquid crystal layer via the low melting point metal removed region 14 is seen. Therefore, the figure formed by the low melting point metal removed region 14 is seen to be red.

On the other hand, when the discrimination medium shown in FIG. 11 is viewed via an optical filter allowing a left-handed circularly polarized light to selectively pass therethrough, red reflected light from the cholesteric liquid crystal layer via the low melting point metal removed region 14 is blocked by the optical filter. Therefore, the discrimination medium is different in appearance between the case in which the viewing is performed via the optical filter allowing a right-handed circularly polarized light to selectively pass therethrough and the case in which the viewing is performed via the optical filter allowing a left-handed circularly polarized light to selectively pass therethrough. Thus, the visual discrimination can be performed by using two kinds of the optical filters. The determination of the authenticity can be effectively performed by using the visual discrimination.

In the structure shown in FIG. 11, the multilayer film 5 or the cholesteric liquid crystal layer, which is used instead of the multilayer film 5, may be subjected to hologram working. Thus, the figure formed by the low melting point metal removed region 14 can be combined with the figure of the hologram.

A thin printed layer may be formed on the film of Sn, which is used as the breakable print recording layer 4. For example, when a thin and yellow ink is printed on the film of Sn, luster of Sn is seen via the white layer, and gold color can be substantially seen. The color and the luster of the breakable print recording layer 4 can be controlled by forming this thin film.

INDUSTRIAL APPLICABILITY

The present invention can be applied to techniques for determining whether or not passports, documents, various cards, passes, bills, exchange tickets for money, bonds, security notes, gift certificates, pictures, tickets, public game voting tickets, recording media in which sound data and image data are recorded, recording media in which computer software is recorded, various products, and packages of the products are authentic. The discrimination medium of the present invention can be used for opening discrimination seals for discriminating whether or not a package has been unsealed.

The invention claimed is:

1. A discrimination medium comprising:

a cholesteric liquid crystal layer having a circular polarization light selectivity of reflecting predetermined circularly polarized light and having a surface;

a breakable print recording layer comprising one or more of a metal and an alloy provided at least at a portion of at least the surface of the cholesteric liquid crystal layer; and the breakable print recording layer having a printed layer provided thereover, wherein a portion of the breakable print recording layer and the printed layer is removed from the discrimination medium, one or more portions of the cholesteric liquid crystal layer are exposed, and the exposed one or more portions of the cholesteric liquid crystal layer are viewable in a specific color via an optical filter allowing a predetermined circularly polarized light to selectively pass therethrough, wherein the printed layer has substantially the same color as the color of the cholesteric liquid crystal layer when the cholesteric liquid crystal layer is viewed from a predetermined direction, wherein the exposed one or more portions of the cholesteric liquid crystal layer are not viewed from the predetermined direction via an optical filter allowing a circularly polarized light selectively reflected from the cholesteric liquid crystal layer to selectively pass therethrough, and the exposed one or more portions of the cholesteric liquid crystal layer are viewed from the predetermined direction via an optical filter allowing a circularly polarized light having a circular polarization direction opposite to a circular polarization direction of the circularly polarized light selectively reflected from the cholesteric liquid crystal layer to selectively pass therethrough, and wherein a barcode pattern is formed by using the exposed one or more portions of the cholesteric liquid crystal layer, and at least a portion of the cholesteric liquid crystal layer is subjected to hologram working or embossing.

* * * * *